United States Patent [19]

Merrigan

[11] 4,437,456
[45] Mar. 20, 1984

[54] HEAT COLLECTOR

[75] Inventor: Michael A. Merrigan, Santa Cruz, N. Mex.

[73] Assignee: The United States of America as represented by the United States Department of Energy, Washington, D.C.

[21] Appl. No.: 278,288

[22] Filed: Jun. 29, 1981

[51] Int. Cl.³ .............................................. F24J 3/02
[52] U.S. Cl. ................................. 126/433; 126/434; 126/435; 126/449; 126/452; 165/104.26
[58] Field of Search ................ 126/434, 433, 435, 449, 126/450, 452; 165/104.13, 104.21, 104.22, 104.26; 202/234; 203/DIG. 1

[56] References Cited

U.S. PATENT DOCUMENTS

| | | | |
|---|---|---|---|
| 3,875,926 | 4/1975 | Frank | 165/104.26 |
| 3,971,634 | 7/1976 | Ranken et al. | 48/120 |
| 4,010,733 | 3/1977 | Moore | 126/271 |
| 4,027,653 | 6/1977 | Meckler | 126/271 |
| 4,067,315 | 1/1978 | Fehlner et al. | 126/271 |
| 4,135,490 | 1/1979 | Soleau, Jr. | 126/450 |
| 4,184,477 | 1/1980 | Yuan | 165/104.26 |
| 4,267,825 | 5/1981 | Ward | 126/433 |
| 4,269,170 | 5/1981 | Guerra | 126/428 |
| 4,284,066 | 8/1981 | Brow | 126/435 |

FOREIGN PATENT DOCUMENTS

| | | | |
|---|---|---|---|
| 936336 | 11/1955 | Fed. Rep. of Germany | 165/104.21 |
| 1541221 | 2/1979 | United Kingdom | 165/104.22 A |
| 675299 | 7/1979 | U.S.S.R. | 165/104.21 |

OTHER PUBLICATIONS

Lucas, Ted, *How to Build a Solar Heater*, Pasadena, California: Ward Ritchie Press, 1975, pp. 26–29 and 37–43.
S. Katzoff, "Heat Pipes and Vapor Chambers for Thermal Control of Spacecraft," A1AA Paper 71-411, (1971).
D. R. Koenig, "The Upside Down Heat Pipe," Los Alamos National Laboratory Progress Report LA-86-49-PR, UC-80, Dec. 1980, pp. 36–37.
J. C. Francken, "The Heat Pipe Fin, A Novel Design of a Planar Collector," 1975 International Solar Energy Congress and Exposition, Proceedings, HP-22025.
G. Yale Eastman, "The Heat Pipe," *Scientific American* 218(5), 1968, pp. 38–46.
W. Bienert, "Heat Pipes for Temperature Control," at the 4th Intersociety Energy Conversion Conference, Wash. D.C., Sep. 1969.
D. K. Edwards et al., "User's Manual for the TRW Gaspipe Program," TRW Document No. 13111-60-22-RO-OO, Apr. 1971, pp. 2-1 to 2-5.
J. Manrique et al., "The Effect of a Black Chrome Selective Surface on the Thermal Performance of a Solar Collector," Letters in Heat and Mass Transfer, vol. 7, pp. 25–31, 1980.

*Primary Examiner*—Lee E. Barrett
*Attorney, Agent, or Firm*—Elizabeth O. Slade; Paul D. Gaetjens; Lee W. Huffman

[57] ABSTRACT

A heat collector and method suitable for efficiently and cheaply collecting solar and other thermal energy are provided. The collector employs a heat pipe in a gravity-assist mode and is not evacuated. The collector has many advantages, some of which include ease of assembly, reduced structural stresses on the heat pipe enclosure, and a low total materials cost requirement. Natural convective forces drive the collector, which after startup operates entirely passively due in part to differences in molecular weights of gaseous components within the collector.

13 Claims, 4 Drawing Figures

HEAT COLLECTOR

The invention is a result of a contract with the Department of Energy (Contract No. W-7405-ENG-36).

BACKGROUND OF THE INVENTION

This invention relates generally to solar and other heat collectors and to methods of using such collectors and relates more particularly to solar collectors employing heat pipes in a gravity-assist mode and to methods of using such collectors.

Heat pipes are well known to be very efficient transmitters of heat. See, for example, the discussion by G. Yale Eastman, "The Heat Pipe," Scientific American, 218(5), pp. 38–46 (1968). As disclosed therein, the heat pipe is essentially a closed, evacuated chamber, the inside walls of which are lined with a capillary structure or wick that is saturated with a volatile fluid. In a typical cylindrical heat pipe, the input of heat to one end of the pipe causes the working fluid to evaporate from the wick and also increases the vapor pressure at the heat input end. As a result, the vapor moves down the core of the pipe, carrying heat energy toward the output end. When heat is removed from the pipe, the vapor condenses and the condensate goes back into the wick, returning to the input end by capillary action.

Generally, heat pipes are evacuated at least partially. As discussed in S. Katzoff, "Heat Pipes and Vapor Chambers for Thermal Control of Spacecraft," AIAA Paper 71-411, 1971, at page 14, generally in the prior art if the heat pipe were not at least partially evacuated (and a large percentage of noncondensable gas were present in the heat pipe along with the vapor), the noncondensable gas would be transported to the cold end of the heat pipe in operation, and would effectively blank off the condenser area, interfering with the operation of the heat pipe. However, not all heat pipes are completely evacuated. Sometimes controlled amounts of noncondensable gas are put into the heat pipe in order to provide for temperature regulation. See, for example, the discussion in "Heat Pipes for Temperature Control," by W. Bienert at the 4th Intersociety Energy Conversion Conference, Washington, DC, Sept. 1969. In general the amount of noncondensable gas remaining in the heat pipe must be carefully controlled to provide a range of operating conditions without completely stopping the heat transfer operation of the device. The determination of allowable quantities of noncondensable gas has been the subject of extensive analysis. See, for example, D. K. Edwards et al., "User's Manual for the TRW Gaspipe Program," TRW Document No. 13111-6022-RO-00, April 1971, pp. 2-1 to 2-5.

Heat pipes have been used in solar collectors in various configurations, both as high thermal conductance elements attached to plate-type collectors and as extended area vapor chambers. Both plate and chamber configurations have been operated in a gravity-assist mode. A vapor chamber, extended area heat pipe solar collector is described in J. C. Francken, "The Heat Pipe Fin, A Novel Design of A Planar Collector," 1975 International Solar Energy Congress and Exposition, Proceedings, HP 77-22025, which discloses a finned type of collector, based on the heat pipe principle. The design of that collector requires, however, that the heat pipe be evacuated in order for the apparatus to operate, and, consequently, that the heat pipe envelope be hermetically sealed.

In U.S. Pat. No. 4,067,315 to Fehlner et al., a solar collector heat pipe is disclosed which is an improvement on a known type of heat pipe adapted for use in the collecting of solar energy, in which a hermetically sealed chamber or envelope of tubular form has evacuated therefrom all noncondensable gases. However, the improvement of that invention also uses a hermetically sealed envelope; and the presence of noncondensable gas within the envelope does not at all appear to be desirable.

In U.S. Pat. No. 4,027,653 to Meckler, "Solar Energy Collector," one embodiment of the device of that invention (shown in FIGS. 4 and 6 in that patent) employs an interior region which is not evacuated. However, upon close examination of that patent, it appears clear that the description in the patent does not lead one to the heat collector of this invention, which operates quite differently from the devices in the patent. Using the design of the apparatus of FIGS. 4 and 6 of the patent, one would find that the noncondensable gas present in the unevacuated chamber would accumulate at the cool end of the tube and would limit the heat transfer to the circulated liquid to the latent heat of that vapor which diffused through the gas.

Therefore, despite what has been known in the prior art, a need has existed until now for a heat pipe solar collector having a relatively good efficiency, being easily assembled on-site and having a low cost.

SUMMARY OF THE INVENTION

An object of this invention is an apparatus for collecting heat which has a relatively good efficiency, which is easily assembled on-site, and which can be made of lowcost materials with a low total materials cost requirement.

Yet another object of this invention is a heat collector which has a low internal pressure at stagnation.

Yet another object of this invention is a collector which can sustain freezing without damage and without the use of potentially toxic chemicals.

Another object of this invention is a method of collecting solar heat in a way which is efficient and inexpensive.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise the following elements which make up a heat pipe heat collector to be used in a gravity-assist mode: (a) an unevacuated sealable housing means into which heat energy can enter during operation; (b) a liquid spreading means (e.g., a wick) located within the housing onto which heat energy impinges, causing a liquid which is present on the wick to evaporate and circulate upwardly, together with a noncondensable gas, (c) a condenser means on which the condensable vapor condenses and flows back down onto the wick; and (d) a separate path provided by a nonporous divider means, below which the noncondensable gas can circulate within the housing. After the mixture contacts the condenser means and the major part of the condensable fluid is separated out of the mixture, the noncondensable gas continues to circulate separately from most of the condensable gas along the separate path within the collector to a point where it passes over the wick and again mixes with vapor of the condensable gas. The driving mechanism of the heat collector is in part a difference in molecular weights (or densities) of the noncondensable gas as compared with the condensable vapor, the former being heavier than the latter (and heavier than mixtures of the gas and the vapor), thus setting up a potential difference which drives the collector.

In a preferred embodiment, the housing means is expandable, the noncondensable gas is air, and the condensable vapor is water.

The present invention may also comprise, in accordance with its objects and purposes, a method of collecting heat energy comprising: (a) allowing heat energy to evaporate a condensable fluid from a liquid spreading means within a sealed housing in the presence of a noncondensable gas, the density of the noncondensable gas being greater than the density of vapor of the condensable fluid; (b) condensing the condensable vapor on a condenser means, so as to transfer heat to a fluid located within the condenser means; (c) allowing the noncondensable gas to continue to circulate within the housing along a path which is separate from the path of substantially all of the condensable fluid; (d) and allowing the noncondensable gas to merge with vapor of the condensable fluid adjacent to the liquid spreading means. Then, heat can be recovered from the fluid located within the condenser means.

The objects of the invention are satisfied and many advantages result due to the separate path which is provided for the noncondensable gas to circulate separately from the condensable vapor within the housing of the solar collector. Because of this design, no vacuum is required in the heat collector; and, thus, the apparatus can easily be assembled on-site, structural materials having high strengths are not required, and problems involved in vacuum evacuation and sealing and manufacturing are not encountered. Additionally, because of heat collector design substitutes vapor flow convection for conduction (used in many conventional solar collectors) as a means of transporting the distributed heat input to a secondary liquid loop, there is a resulting reduction in the material cost requirements of the solar collector and therefore in the areal cost of the collector surface. Operation of the device in a convectively driven, gravity-assist mode of operation effectively eliminates length restrictions imposed by capillary pumping limitations and permits optimization of the collector length. Plastics, for example, can be used as structural materials for the collector and can even be rolled up during shipment. And, because the collector housing can be made of an expandable material, positive pressure at stagnation can be minimized. Also, the night-time heat loss is minimized in this collector by its high inherent reverse impedance. For example, if water is used in the collector, the device will not work below 32° F.

Other advantages include the following. Due to the use of the heat pipe design, the absorbing surface is at approximately constant temperature and there is no temperature increase between flow passages, as occurs in tubefin collectors. When a soft wick is used as the liquid spreading means, the collector can sustain freezing without damage. Because this is a gravity-assist collector, the length of the heat pipe will not be a limiting factor. Because water can be used as the operating fluid, fluid availability and toxicity problems are minimized; and the normal mode of operation of the collector provides a fluid barrier (which is required by law in some states) between the collector and potable water. Furthermore, because a heat pipe design is used, the condenser collection temperature is independent of the prime collection area, (unlike optical concentration collectors wherein the collection temperature is a direct function of the ratio between the prime collection area and the condenser area). This characteristic serves to reduce losses and increase the efficiency of the device by permitting design for end use temperature as the maximum system temperature.

The feature of the limitation of high stagnation pressures through the use of an expandable collector envelope and a limited fluid inventory is also believed to be a novel feature in a solar collector employing a phase change (as here). By use of this feature, rather than by use of a working fluid having a low critical pressure, a working fluid having a high heat of vaporization (for example, water) can be used and the amount of vapor flow required for a given heat input is reduced.

The existence of the barrier surface between the fluid in the collector body and in the secondary loop eliminates the need for a separate heat exchanger in potable water systems. An emergency relief valve may be provided to eliminate the possibility of damage to the collector under stagnation conditions and to serve as a redundant means of internal pressure control.

BRIEF DESCRIPTION OF THE DRAWINGS

The accompanying drawings, which are incorporated in and form a part of the specification, illustrate various embodiments of the present invention and, together with the description, serve to explain the principles of the invention. In the drawings.

The same numbers are used in all figures to show the same items.

DESCRIPTION OF THE PREFERRED EMBODIMENTS

Figure 1:
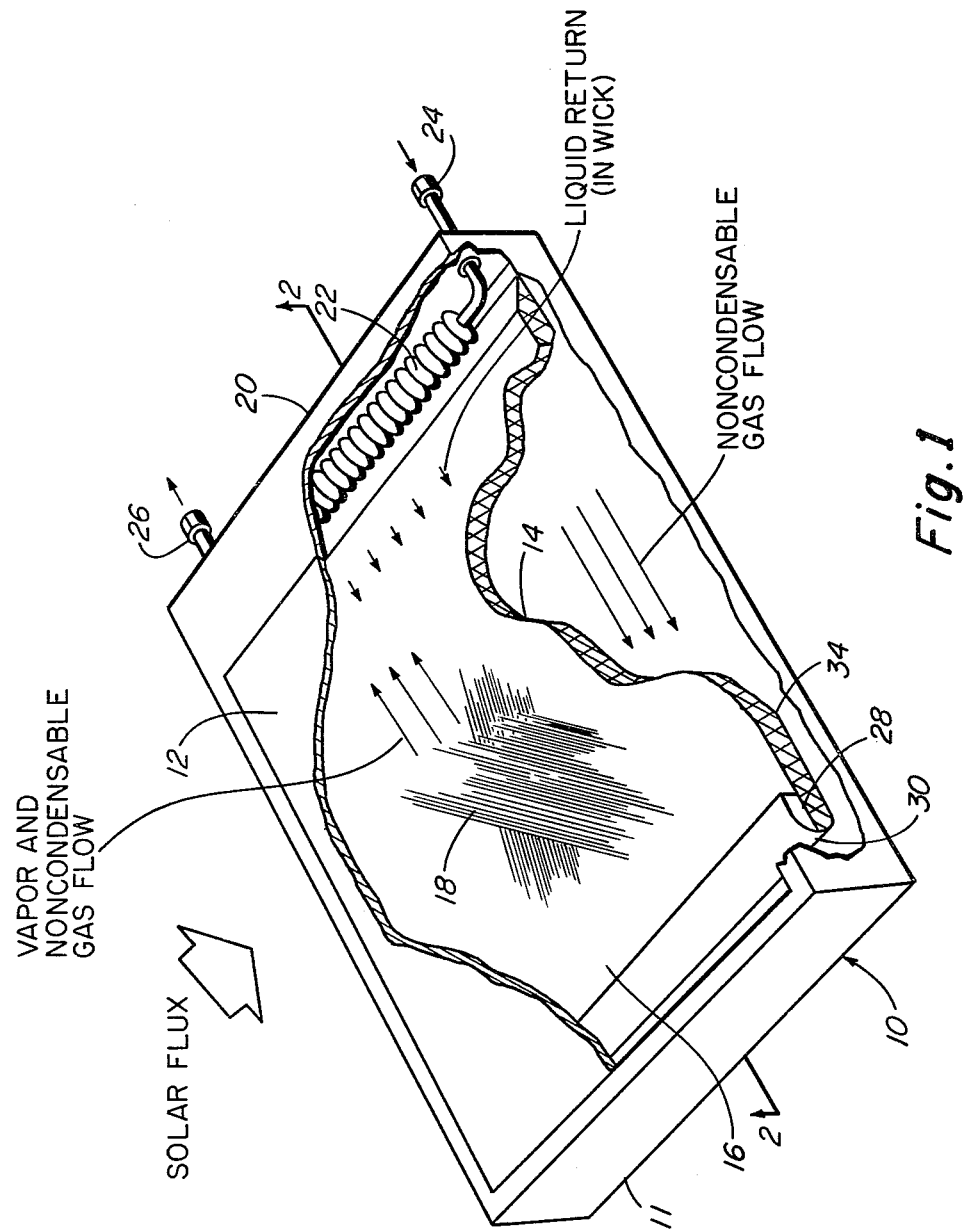
In FIG. 1, a heat pipe solar collector of the invention is shown in an elevational view, partially in cross-section.

Referring to the drawing, shown in FIG. 1 is an embodiment of the heat pipe solar collector of the invention, referred to generally as 10, which comprises an insulated, sealable enclosure 11 which is provided with a solar transparent surface 12. Under the transparent surface 12 is a primary heat absorption surface 14 made up of a nonporous plate 16 covered with a porous material 18, which acts as a capillary wick and which serves as a means of distribution for a condensable fluid, the phase of which is changed during operation of the solar collector. Near the upper end 20 of the collector is a condenser means (i.e., heat exchanger) 22 that is cooled by a secondary cooling loop having an inlet 24 and an outlet 26. Vapor (for example, water vapor) is condensed on this condenser means 22 and returned to the porous material (capillary wick) 18 by gravity flow. A liquid reservoir 28 lies across the bottom 30 of the primary heat absorption surface 14 and serves to collect and store reserve fluid. Additional reservoirs (not shown) may be located across the primary heat absorption surface 14 at intervals along its length in order to reduce the capillary head requirements of the wick, particularly in start-up. A separate return path 32 for the noncondensable gas (for example, air) extends underneath nonporous plate 16 from the heat exchanger 22 to the bottom end 30 of primary heat absorption surface 14. This return path 32 permits the desired flow of the noncondensable gas to result from natural convection which occurs due to the reasons described below. Plate 16 has insulation 34 along its lower face.

Figure 2:
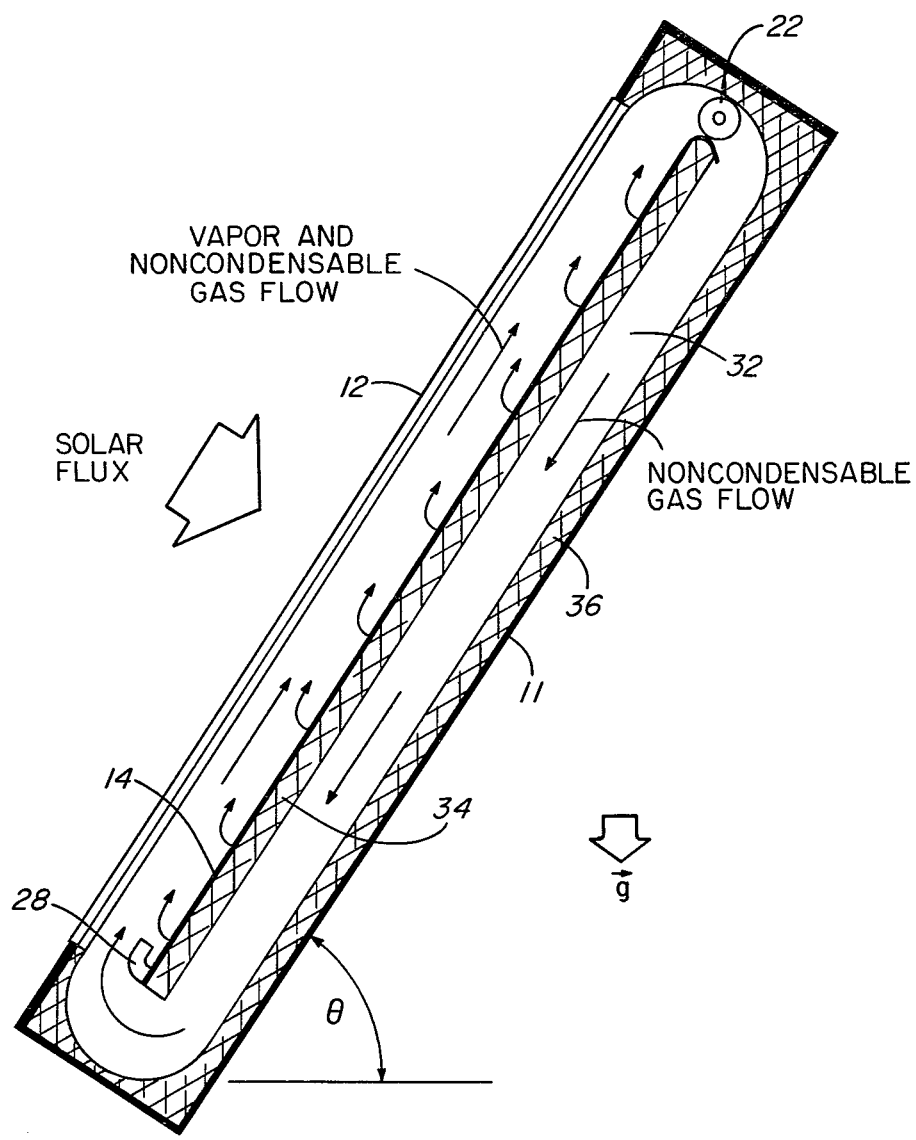
In FIG. 2 is shown, in cross-section, a portion of FIG. 1 taken along the lines 2—2, the wick being located upon the centrally located flow divider plate.

In FIG. 2, the collector 10 of FIG. 1 is shown in cross-section along the line 2—2, the collector 10 being oriented at an angle of $\theta$ with the horizontal. The solar flux is shown incident upon transparent surface 12 and upon primary heat absorption surface 14. Along the upper face of plate 16, condensable liquid condenses at condenser means 22 and flows down the upper face of porous material 18 (not shown in detail in FIG. 2) and then evaporates from that capillary wick surface and combines with noncondensable gas which is present within the solar collector. At condenser means 22, however, the noncondensable gas does not condense and instead continues its flow and passes underneath plate 16 within return path 32. Also shown in FIG. 2 is insulation 36, which is used to insulate all exterior surfaces of collector 10, with the exception of transparent surface 12.

Figure 3:
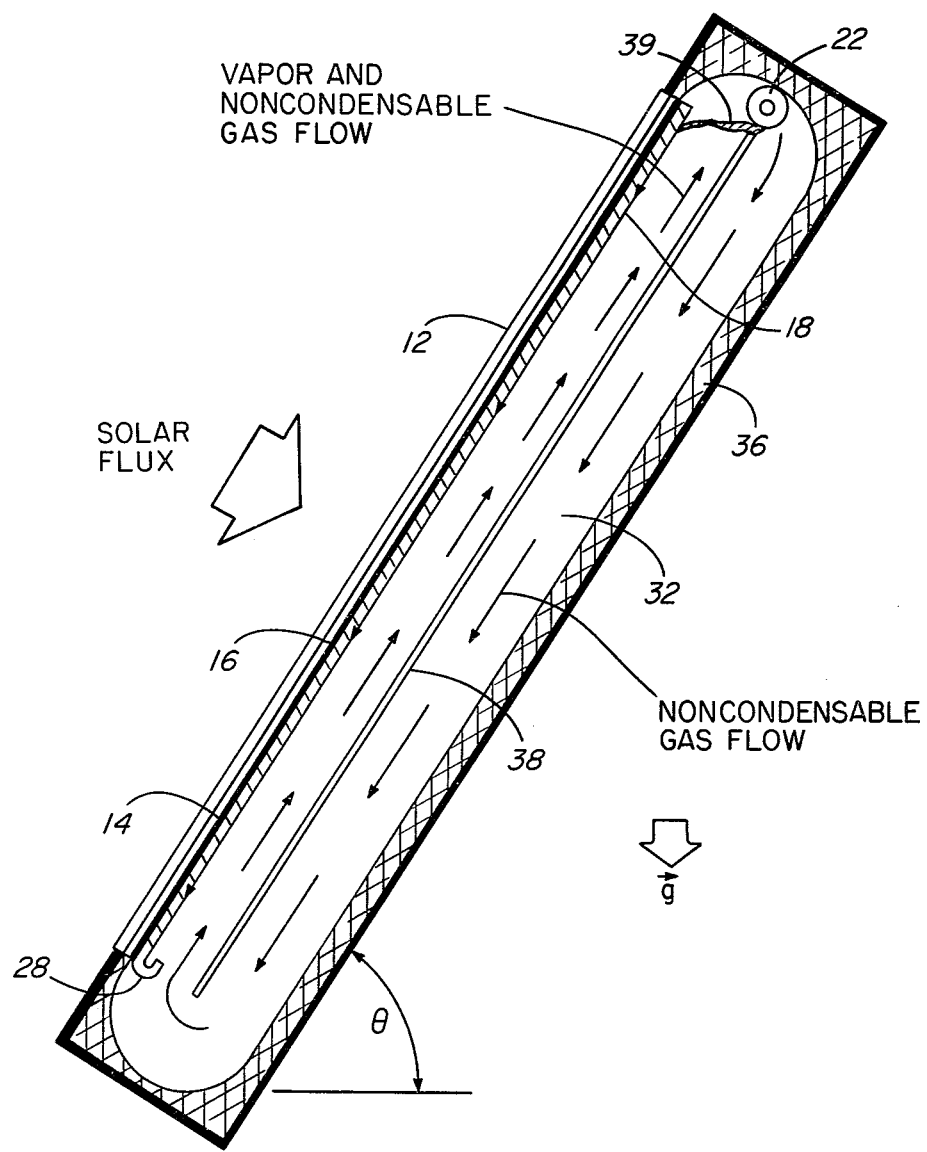
In FIG. 3 is shown an alternate embodiment, wherein the wick is located on backing which is positioned adjacent to the wall through which solar energy enters the housing.

In FIG. 3, plate 16 is shown adjacent to transparent surface 12; and on the lower side of plate 16, the porous material 18 is situated. A nonporous flow divider plate 38 provides the separate return path 32 for the noncondensable gas. Again, the primary heat absorption surface 14 is made up of a collector plate 16 covered with a porous material 18. In FIG. 3, however, a means for conducting liquid 39 from heat exchanger 22 back onto porous material 18 connects condenser means 22 and porous material 18. This means for conducting liquid 39 can be a liquid feeder wick, for example, which will be intermittent along end 20 (shown in FIG. 1) to allow for flow of the noncondensable gas into path 32.

In either of these configurations the transfer of heat to the condenser surface with low thermal resistance is achieved by ensuring that the velocity of the gas mixture over the condenser surface is such that the heat transfer is not diffusion limited.

Figure 4:
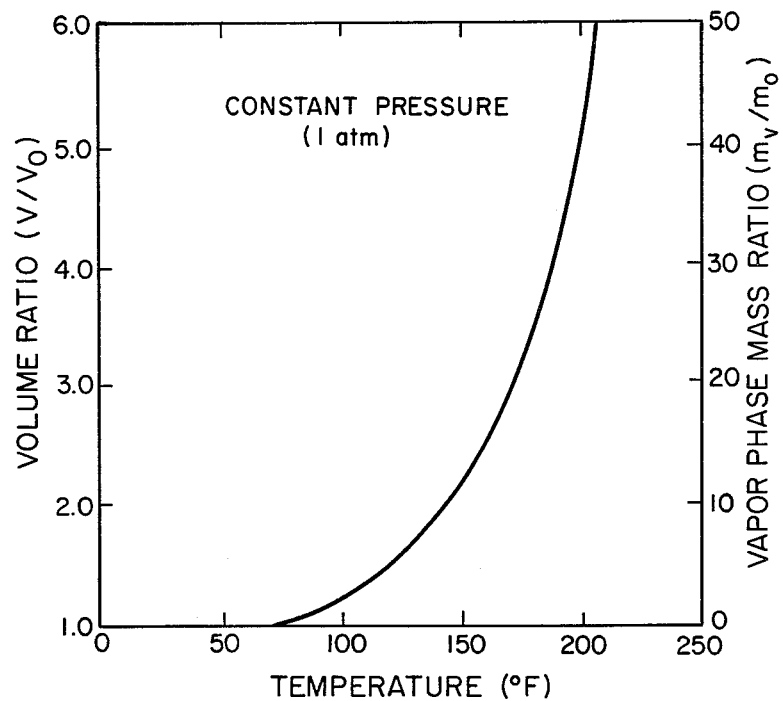
In FIG. 4 the principle underlying the use of an expandable heat pipe envelope as a means of limiting stagnation pressure is illustrated.

FIG. 4 gives the volume ratio and mass ratio for vapor as a function of temperature for the region of operation in which both liqud and vapor phases of the working fluid are present and the total pressure is held constant at one atmosphere. If the total amount of liquid in the collector is limited to some value such as 30 times the initial mass of vapor a volume ratio of about 4.0 will provide essentially constant pressure. At higher stagnation temperatures the working fluid will be present only in the vapor phase and the increase in pressure will be proportional to the change in absolute temperature. By this means the total pressure may be limited to values below those corresponding to saturation conditions for the working fluid at stagnation temperature.

In operation, the solar collector 10 can be conveniently assembled where it is to be used because a vacuum is neither needed nor desired in the apparatus of the invention. At start-up, a certain amount (for example, sufficient quantity to saturate the porous material 18) of a condensable liquid (for example, water) is placed into liquid reservoir 28. Then, the transparent surface 12 will be placed onto insulated, sealable enclosure 11 and sealed thereto, thus providing a sealed enclosure. Cooling liquid will be introduced into heat exchanger 22 via inlet 24 and will be removed therefrom via outlet 26. A potential difference is set up by the difference in the molecular weight of the condensable gas and the molecular weight of the noncondensable gas, this potential difference in part providing the driving force in the operation of the solar collector. Additional potential is provided by any change in the temperature of the noncondensable gas (i.e., sub-cooling, where sub-cooling is defined to be cooling below the saturation temperature) in passing through the condenser. For example, if water is the condensable fluid and air is the noncondensable gas, because the density of a mixture of water vapor and air is less than the density of air, the mixture of water vapor and air will rise and will contact condenser means 22. Then, when the air is separated from the water vapor at condenser means 22, the air will tend to fall down path 32 and will set up a convection loop due to the presence of the nonporous divider plate 38 (shown in FIG. 3) or the nonporous plate 16 (shown in FIG. 1), each of which serves to create a separate return path 32 for the noncondensable gas.

In the practice of the invention, it is required that there be a separate path for the noncondensable gas so that it can circulate separately from the vapor in that portion of the path where the liquid spreading means is not present.

Because the driving force which sets up the convection loop results partially from a difference in molecular weight between the vapor and the noncondensable gas, it is required that the housing not be evacuated and that such a difference in molecular weights exist. For some purposes, it may be preferred to maximize this difference in molecular weights; and this can be achieved by proper choice of vapor and noncondensable gas. For example, water vapor and argon gas would set up a quite large potential difference. On the other hand, if argon were used, the apparatus could not easily be assembled on-site, as can be done when air is the noncondensable gas.

The type of noncondensable gas which is used should be a gas which does not condense on heat exchanger 22.

The type of condensable fluid which is used in the solar collector and which condenses on heat exchanger 22 will be selected as described above. However, water can be used as this fluid and may be preferred in order to avoid any possible contamination of potable water.

A liquid spreading means will be used in the practice of the invention. A separate porous material (for example, a capillary wick) 18 can be bonded onto plate 16; and this arrangement has been shown (as described in the examples below) to give good results. However, it is believed that plate 16 can suitably be channeled so that it itself becomes the liquid spreading means, by embossing, etching, or otherwise texturing the surface. A screen wick is also believed to be suitable, provided that the backing is uniformly attached to the screen wick.

As described above, porous material 18 can be located (as shown in FIG. 2) on plate 16; and plate 16 can itself (or together with insulation 34) form the divider means. Alternatively, as shown in FIG. 3, the porous material 18 can be located on the lower side of plate 16. This orientation allows the use of frequency selective solar absorptive coatings (not shown) for the absorption surface. Use of this type of surface in solar collector applications is described in "The Effect of a Black Chrome Selective Surface on the Thermal Performance of a Solar Collector," J. A. Manrique and R. Suarez, Letters in Heat and Mass Transfer, Vol. 7, pp. 25–31, 1980, Pergamon Press.

Condenser means 22 will condense the condensable fluid when a cooling liquid is circulated into inlet 24 and out of outlet 26. Examples of suitable liquids for this use include water, water-glycol mixtures or other normal heat transfer fluids. However, when the solar collector is to be used near potable water, it is preferred to use water as the liquid in the condenser means 22 so as to avoid contamination of the potable water with potentially biologically harmful liquids.

Also required in the practice of the invention is that the apparatus be used in a gravity-assist mode, with the condenser means 22 at one end being located at an elevation higher than the opposite end of the solar collector. Additionally, it is required that the collector materials not outgas so much at stagnation that the collector becomes opaque. Therefore, certain types of wood, for example, should not be used.

In the embodiment shown in FIGS. 1 and 2, two layers of transparent surfaces 12 will preferably be used so that the vapor does not condense on the surfaces 12. However, in the embodiment shown in FIG. 3, only one layer need be used because plate 16 serves to prevent the problem of condensation of the vapor on the surface.

In order to avoid the problem of stagnation, the solar collector can have at least one expandable wall, which can be transparent surface 12. As shown in FIG. 4, as the temperature increases, in order to maintain a constant pressure within the solar collector, the volume ratio (i.e., the vapor volume at a given temperature as compared with the vapor volume at the filling temperature) increases and the amount of the working fluid occupying the vapor space also increases. The quantity of working fluid in the liquid phase will go to zero at some stagnation temperature above the atmospheric boiling point.

The apparatus of the invention can be used in combination with any suitable means of flow circulation through the secondary cooling loop or with alternative means of secondary heat transport (i.e., alternative condenser means) such as conventional heat pipes or the upside down heat pipe configuration of Daniel R. Koenig, "The Upside Down Heat Pipe," Low Alamos National Laboratory Progress Report LA-8649-PR, UC-80, Issued: December, 1980, pp. 36–37. Use of one of these heat pipe secondary heat transport methods would provide the basis for an entirely passive heat collection, transport, and storage system. This solar collector would be placed above (for example, on a roof) and for example the upside down heat pipe apparatus of that progress report would be operably connected thereto but positioned below the present solar collector, thus providing solar heated hot water to be transported into a dwelling, for example.

Other potential applications of the heat collector in the configuration shown in FIG. 3 include its use as an electronic equipment mounting surface in closed equipment cabinets and similar configurations where circulation of air directly over the electronic components for cooling is prohibited and a secondary liquid heat sink is to be used. However, in these applications and in those described below, the transparent surface 12 would not be used.

The heat collector may be used as an extended surface for heat transfer where a large surface area is required in order to allow the use of natural convection or low velocity forced convection external to the device. Examples of this sort of application would include interior building air conditioning panels or exterior heat pump heat exchange panels. In either of these cases the device would serve as a means of transforming a low density heat flux over a comparatively large surface area to a high density flux at the condenser interface with the secondary loop. The heat collector principle may be applied to geometries other than planar collectors. For example, the device in paired, cylindrically symmetric form may be used to provide an increased heat transfer area surrounding a pipe or tube for either heating or cooling.

EXAMPLES

The following examples were carried out, illustrating several embodiments of the invention.

A collector substantially as shown in FIG. 1 was assembled having a main enclosure 14 in. by 98 in. by 5 in. formed of 0.020 galvanized sheet metal reinforced with ⅛ in. × 1 in. × 1 in. aluminum extrusions. The sides and bottom of the enclosure were insulated with 1 in. thick polystyrene foam insulation board. Joints in the insulation board and other seams in the box were sealed with silicone rubber sealant. A center divider panel of 0.035 copper sheet, insulated on the back side with 1 in. polystyrene foam, was installed with a 2 in. space between insulation layers. A 12 in. length of condenser tube was installed across the top of the enclosure. Internal diameter of the copper tube was 0.565 in., and o.d. 0.625 in. Circular fins of 1.5 in. diameter and about 0.010 in. thickness were pressed onto the tube exterior with a spacing of 0.10 in. Total surface area of the condenser tube fin assembly was 2.62 ft². The condenser tube was centered over the flow divider plate with a spacing of about ⅛ in. between the upper edge of the plate and the top of the fins.

The divider plate was covered with a single layer of black polyester double knit material held in place with a continuous film of Scotch photomount spray adhesive sprayed over the entire divider plate surface. Approximately 1 in. of material extended past the upper edge of the plate. This material was wrapped on a spring form so as to be held in contact with the lower fin edge. At the lower edge of the center flow divider 16 this wick material was interrupted by 2 openings, each approximately 1½ in. by 3 in., connecting the air return space 32 behind the divider plate with the evaporator space adjacent to wick 18. These openings substituted for the space shown at the end of plate 16 in FIG. 1. Below the openings was a fluid reservoir 28 consisting of a trough approximately ½ in. deep extending the width of the plate 16. The lower end of the wick material extended into this trough. Front closure of the collector consisted of 2 sheets of double strength glass separated by ¼ in. aluminum extrusion and sealed with 2-side foam tape.

This glazing was sealed to the collector body with aluminum backed adhesive tape. The transparent aperture measured 12 in. by 40 in. A small diameter tube at the top of the wick panel was provided for the addition of liquid and a drain at the bottom for its removal. The complete panel was mounted at an angle of approximately 50° to the horizontal with the condenser at the upper end.

Instrumentation used in panel tests included a rotameter flow meter for condenser secondary flow measurement, a Delta-T differential temperature transducer for secondary flow temperature rise, and an Eppley Model 8-48 pyranometer for solar insolation. The pyranometer was mounted at the upper end of the collector at approximately the same height as the condenser and was oriented parallel to the collector surface. In addition nine thermocouples were provided for measurement of tube and fin temperatures, collector plate temperatures, and vapor and noncondensable gas temperatures.

Experimental Data

The experimental collection efficiency of the device was determined from the following relationship $$\text{Efficiency} = \mu = \frac{\rho \dot{v} c_p \Delta T_m}{(IA)} = \frac{\text{total energy collected in secondary loop per unit time}}{\text{total incident energy per unit time}}$$

where
- $\rho$ = fluid density in secondary loop (S.L.) through condenser,
- $\dot{v}$ = volume flow rate in S.L. (in gallons per minute),
- $c_p$ = specific heat of fluid in S.L.,
- $\Delta T_m$ = temperature increase (in degrees Centigrade) through condenser in secondary loop as measured by a differential temperature transducer,
- $I$ = solar insolation per unit area measured by an Eppley meter (in BTU per hour per ft$^2$), and
- $A$ = aperture area (in ft$^2$).

Water was used as the fluid in the secondary loop in all runs.

Experimental values tabulated in the table below show that in runs 1-7 the collection efficiency was in the 50-60% range. Then, an internal plug was added to increase flow velocities on the secondary flow side of the condenser and to reduce the secondary flow thermal resistance after tests indicated that low mass flow rates in the secondary loop were necessary to insure accurate temperature measurements. However, after this modification was made, the measured efficiencies decreased to the 25-30% range. Although this decrease is not fully understood at this time, it is believed that to some extent this may have been due to an accumulation of secondary loop fluid contaminants in the flow passages. It is believed that there are no inherent limits to collection efficiency to prevent the attainment of efficiency values of 75-80% and that further experiments will demonstrate this.

TABLE

| Run # | Secondary Flow Rate $\dot{v}$ (gallons/min.) | Coolant ($\rho \dot{v} c_p \Delta T_m$) (BTU/Hour) | Insolation Total (IA) (BTU/Hour) | Efficiency (%) |
|---|---|---|---|---|
| 1 | 0.53 | 510.9 | 1010.2 | 0.51 |
| 2 | 0.53 | 546.7 | 1000.6 | 0.55 |
| 3 | 0.53 | 546.7 | 1000.6 | 0.55 |
| 4 | 0.52 | 326.5 | 637.4 | 0.51 |
| 5 | 0.52 | 373.2 | 631.4 | 0.59 |
| 6 | 0.52 | 384.8 | 625.4 | 0.61 |
| 7 | 0.50 | 358.9 | 601.9 | 0.60 |
| 8 | 0.50 | 145.8 | 571.2 | 0.26 |
| 9 | 0.48 | 150.6 | 541.2 | 0.28 |
| 10 | 0.57 | 166.3 | 518.4 | 0.29 |
| 11 | 0.80 | 143.4 | 511.2 | 0.28 |
| 12 | 0.80 | 125.6 | 451.0 | 0.28 |
| 13 | 0.44 | 157.8 | 451.0 | 0.35 |
| 14 | 0.30 | 309.4 | 1039.4 | 0.30 |
| 15 | 0.28 | 307.7 | 1029.4 | 0.30 |
| 16 | 0.70 | 267.1 | 1019.8 | 0.26 |
| 17 | 0.92 | 144.5 | 414.9 | 0.35 |
| 18 | 0.40 | 107.6 | 405.9 | 0.27 |

The foregoing description of preferred embodiments of the invention has been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A heat pipe heat collector to be used in a gravity-assist mode comprising:
   (a) an unevacuated sealable housing means containing noncondensable gas, said housing means having a first end and a second end and having a wall extending substantially between said first end and said second end through which wall heat energy can enter said housing means when said housing means is sealed;
   (b) a nonporous divider means extending substantially between said first end and said second end which divides said housing into a first portion and a second portion wherein said first portion and said second portion have connecting spaces therebetween located near said first end and near said second end;
   (c) wick means located within said first portion so that heat energy entering said heat collector will heat said wick means so as to cause a first liquid located on said wick means to evaporate in the presence of said noncondensable gas; and
   (d) a condenser means located near said first end and near said divider means and having an inlet and an outlet means for passing a second liquid into and out of said condenser means, said condenser means condensing vapor of said first liquid, which condensed vapor is then conducted onto said wick means so that substantially only said noncondensable gas will circulate from said first end to said second end through said second portion while most of said first liquid remains in said first portion.

2. An apparatus according to claim 1, wherein said housing means is insulated, wherein said heat collector is a solar collector, and wherein a liquid collecting means is located so that liquid can move by capillary action onto said wick means during startup.

3. An apparatus according to claim 2, wherein said wall and said divider means have planar shapes.

4. An apparatus according to claim 3, wherein said wick means is located on said divider means.

5. An apparatus according to claim 3, wherein said wick means is located on the inner side of a plate which is positioned adjacent to said wall.

6. An apparatus according to claim 4 or claim 5, wherein said first liquid is water and wherein said noncondensable gas is air.

7. An apparatus according to claim 4 or claim 5, wherein said first liquid is water and wherein said noncondensable gas is argon.

8. An apparatus according to claim 6, wherein said second liquid is water.

9. An apparatus according to claim 2, wherein said wall is expandable.

10. A method of collecting heat energy comprising:
(a) allowing heat energy to evaporate a first liquid from a wick means located within a sealed housing in the presence of a noncondensable gas, the density of said noncondensable gas being greater than the density of a mixture of vapor of said first liquid and said noncondensable gas so that said mixture rises;
(b) condensing said vapor on a condenser means so as to recover said first liquid on said wick means and so as to provide heat to a second liquid located within said condenser means;
(c) allowing said noncondesable gas to continue its motion along a path which is separate from substantially all of said first liquid; and
(d) allowing said noncondensable gas to merge with vapor of said first liquid in the space adjacent to said wick means.

11. A method according to claim 10 wherein said heat energy is solar energy and including also the step of recovering heat from said second liquid.

12. A method according to claim 11 wherein said first fluid is water and wherein said noncondensable gas is air.

13. A method according to claim 12 wherein said second liquid is water.

* * * * *